US006183136B1

United States Patent
Dingman

(12) United States Patent
(10) Patent No.: US 6,183,136 B1
(45) Date of Patent: Feb. 6, 2001

(54) FLOATING SLEEVE BEARING FOR ELECTRIC MOTOR

(75) Inventor: Guy Dingman, Monon, IN (US)

(73) Assignee: A. O. Smith Corporation, Milwaukee, WI (US)

(*) Notice: Under 35 U.S.C. 154(b), the term of this patent shall be extended for 0 days.

(21) Appl. No.: 09/372,424

(22) Filed: Aug. 11, 1999

(51) Int. Cl.[7] .................................................. F16C 23/04
(52) U.S. Cl. .......................... 384/204; 384/202; 384/206
(58) Field of Search .................................... 384/192, 202, 384/203, 204, 206, 208, 215; 310/90

(56) References Cited

U.S. PATENT DOCUMENTS

| | | | |
|---|---|---|---|
| 2,767,034 | * | 10/1956 | McCloskey . |
| 2,996,308 | * | 8/1961 | Cislo ................................. 384/202 X |
| 3,273,948 | * | 9/1966 | Hoddy et al. ......................... 384/204 |
| 3,325,849 | * | 6/1967 | Waters ............................... 384/204 X |
| 3,539,234 | * | 11/1970 | Rapata ................................. 384/203 |
| 3,820,861 | * | 6/1974 | Strang . |
| 4,227,826 | * | 10/1980 | Conrad ................................. 403/371 |
| 4,318,573 | * | 3/1982 | Hamman . |
| 4,368,931 | * | 1/1983 | Casler et al. ......................... 384/192 |
| 4,986,675 | * | 1/1991 | Dye et al. ............................. 384/192 |
| 5,405,199 | * | 4/1995 | Mabuchi et al. ....................... 384/204 |
| 5,484,211 | * | 1/1996 | Uthoff ................................... 384/192 |

* cited by examiner

Primary Examiner—Thomas R. Hannon
(74) Attorney, Agent, or Firm—Michael Best & Friedrich LLP

(57) ABSTRACT

A floating sleeve bearing assembly for supporting the shaft of an electric motor, the shaft having an axis of rotation and the motor having a stator. The sleeve bearing assembly includes a bearing having therein a bore for receiving the shaft. The bearing has a plurality of cylindrical outer surface portions that are centered on respective axes which are substantially perpendicular to the axis of rotation and which all lie in the same plane substantially perpendicular to the axis of rotation. The sleeve bearing assembly also includes a bearing support bracket having an axis and including a main body fixable relative to the stator. The bracket further includes a plurality of circuitously spaced resilient projections extending from the main body and generally parallel to the bracket axis. Each of the projections has an inwardly facing surface which is convex at the intersection of the surface with a plane substantially perpendicular to the bracket axis, and is concave at the intersection of the surface with a plane including the bracket axis. Together, the projections define a socket centered on the bracket axis for housing the bearing, such that each projection engages a respective one of the cylindrical outer surface portions so as to allow angular movement of the bearing within the socket to compensate for axial misalignment between the axis of rotation and the bracket axis, while at the same time substantially preventing rotation of the bearing about the axis of rotation.

20 Claims, 2 Drawing Sheets

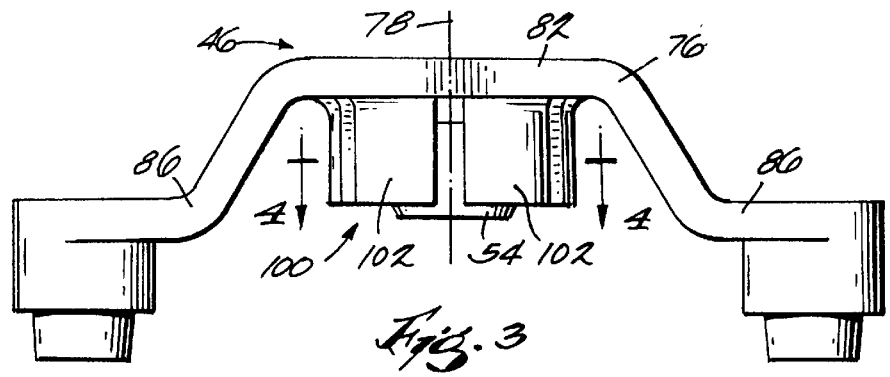
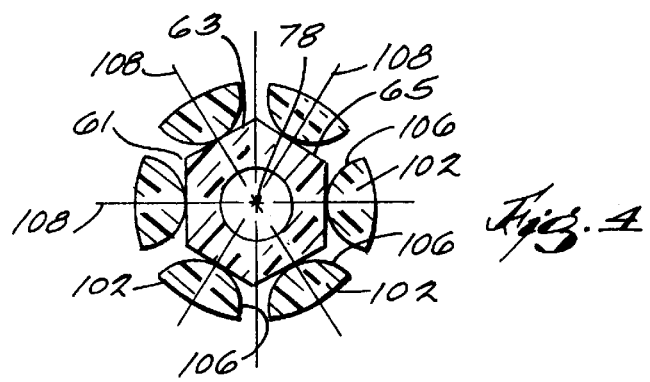
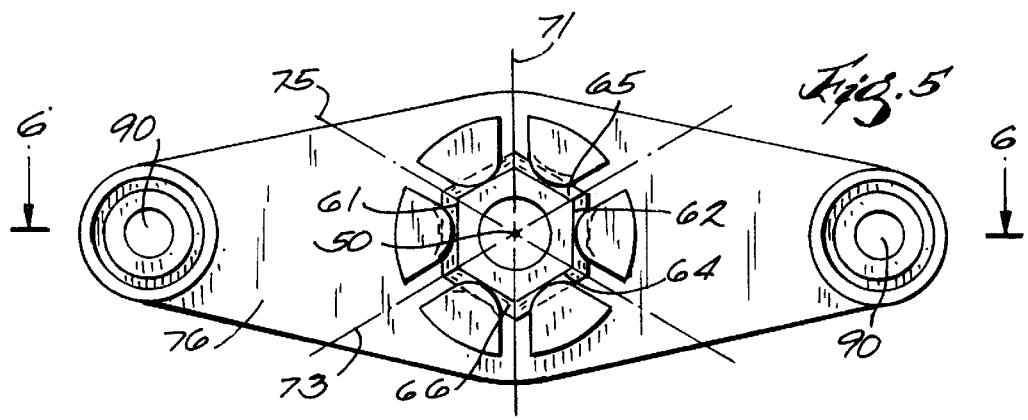
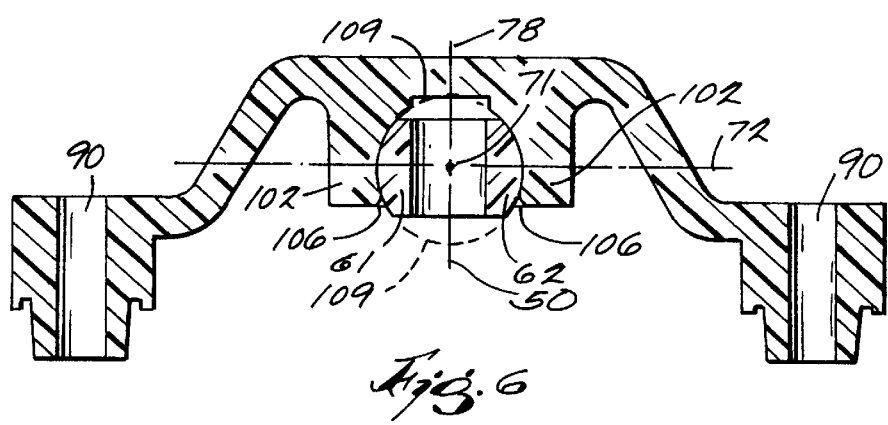

FLOATING SLEEVE BEARING FOR ELECTRIC MOTOR

BACKGROUND OF THE INVENTION

The invention relates to sleeve bearing assemblies for fractional or sub-fractional horsepower electric motors and more particularly to self-aligning, floating bearings for use in such motors.

It is known to use sleeve bearings to support the rotating shaft of fractional and sub-fractional horsepower motors. The sleeve bearings typically include a tubular bore for accepting and supporting the shaft. To compensate for variations in shaft angle during rotation, self-aligning floating sleeve bearings are used so that the tubular bore can constantly align itself with the shaft, minimizing wear on the shaft, bearing, and motor.

While the floating sleeve bearing must be free to align itself with the shaft, the bearing must be restricted from rotating with the shaft. One common design incorporates a bearing with a spherical exterior that is seated in a spherical bearing pocket. To prevent rotation of the bearing, a spring force is applied to the exterior of the bearing, causing friction between the bearing and the pocket. The spring force applied creates enough friction to prevent rotation of the bearing in the pocket, while still allowing the bearing to align itself with the shaft.

Another common design involves cutting grooves into the exterior of the spherical bearing and aligning those grooves with ribs in the bearing seat. The bearing is thus free to align itself with the shaft, while the ribs and grooves prevent rotation.

Yet another design involves machining flat portions on the exterior of an otherwise round or spherical bearing and placing the bearing in a seat designed to engage the flat portions and prevent rotation. Alternatively, the bearing could be press-fit into the seat such that during the press-fitting, the interference between the bearing and the seat deforms the bearing, creating flat portions that engage the seat and anti-rotate the bearing. An example of this design is disclosed in U.S. Pat. No. 4,368,931 issued Jan. 18, 1983.

SUMMARY OF THE INVENTION

The above-mentioned designs are costly to manufacture due to the intricate machining of grooves, ribs, and flats. Assembly is also costly as it involves difficult calculations and installments for delicate spring settings, difficult groove/rib alignments, or difficult press-fit operations that often require special machinery. Furthermore, some of the known methods of anti-rotation unduly restrict the optimal self-alignment of the bearing.

The present invention alleviates the problems commonly associated with the current designs by providing an improved floating bearing that freely aligns with the rotating shaft, but does not rotate with the shaft. The design of the present invention makes it more cost effective to manufacture and assemble. Furthermore, the present invention provides improved bearing performance which, in turn, improves the performance of the motor.

Specifically, the invention provides a floating sleeve bearing assembly including a bearing having a plurality of cylindrical outer surface portions that are centered on respective axes which are substantially perpendicular to the axis of rotation and which all lie in the same plane substantially perpendicular to the axis of rotation. Preferably, the bearing has six such surfaces, with three sets of diametrically opposed surfaces, the two surfaces in each set being centered on the same axis. The surfaces are evenly spaced around the bearing, so that each has an angular extent of sixty degrees (about the rotational axis).

The sleeve bearing assembly also includes a bearing support bracket having a bearing socket defined by a plurality of circuitously spaced resilient projections extending generally parallel to the rotational axis (the projections ideally are exactly parallel to the rotational axis if the bracket is properly mounted, but in practice are likely to be slightly misaligned). Preferably, the number of projections corresponds to the number of cylindrical outer surface portions on the bearing, with each projection engaging a respective bearing surface.

Each of the projections preferably has an inwardly facing surface which is convex at the intersection of the surface with a plane substantially perpendicular to the axis. The inwardly facing surface is also preferably concave at the intersection of the surface with a plane including the bracket axis. Even more particularly, each inwardly facing surface preferably intersects the plane including the bracket axis along a circle centered on the axis of the mating bearing cylindrical surface portion. Thus, the inwardly facing surface of the bracket and the mating cylindrical surface portion of the bearing engage along a portion of the circle. The bracket projections engage the cylindrical outer surface portions so as to allow angular movement of the bearing within the socket to compensate for axial misalignment between the axis of rotation and the bracket, while at the same time substantially preventing rotation of the bearing about the axis of rotation.

Other features and advantages of the invention will become apparent to those skilled in the art upon review of the following detailed description, claims, and drawings.

BRIEF DESCRIPTION OF THE DRAWINGS

FIG. 3 is a side view of the bracket and the bearing.

FIG. 4 is a view taken along line 4—4 in FIG. 3.

FIG. 5 is an end view of the bearing bracket and the bearing.

FIG. 6 is a view taken along line 6—6 in FIG. 5.

Figure 1:
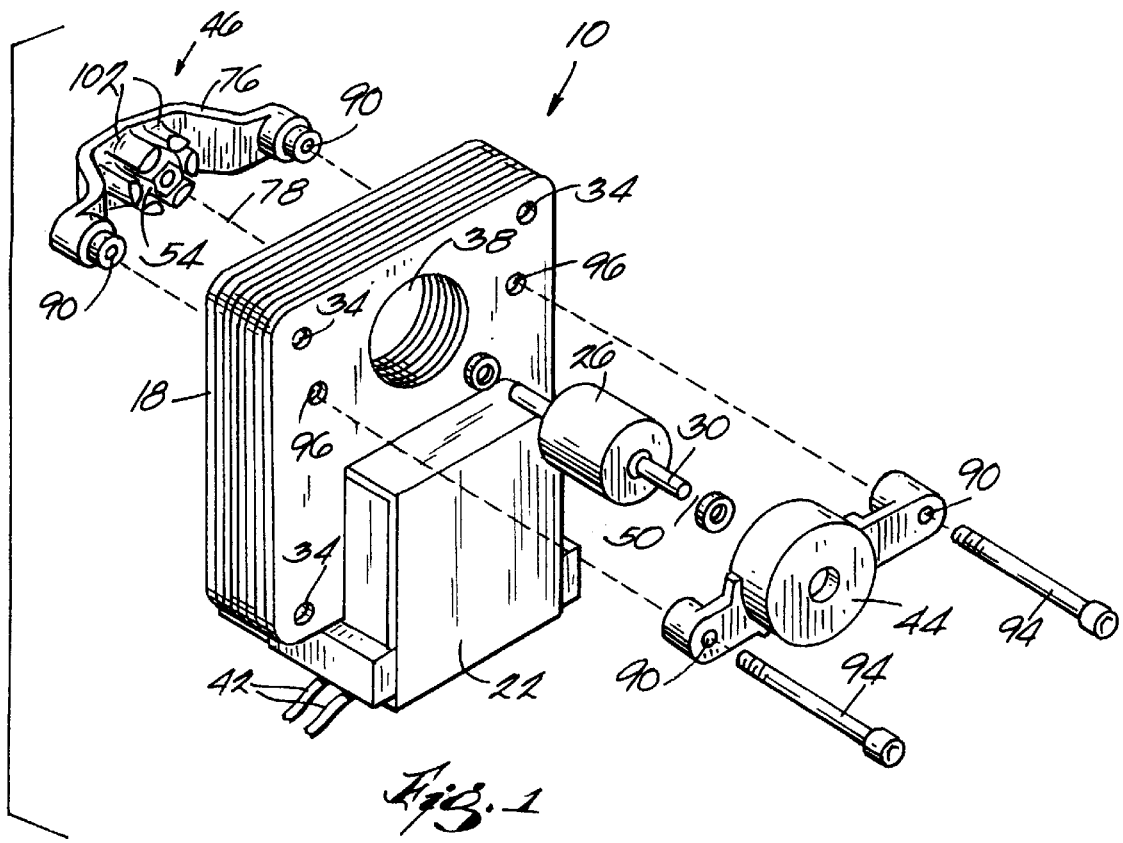
FIG. 1 is an exploded perspective view of a motor embodying the invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DESCRIPTION OF THE PREFERRED EMBODIMENT

An electric motor 10 embodying the invention is shown in the drawings. Preferably, the motor 10 is a fractional or sub-fractional horsepower motor having (see FIG. 1) a stator 18 in the form of a laminated core, a coil 22, and a rotor 26 mounted on a shaft 30. The core laminations are secured together by rivets 34 and have a window 38 for receiving the rotor 26. The coil 22 is connected to any suitable power source via wires 42.

The shaft 30 extends axially from the rotor 26 and is supported at one end by a bearing (not shown) in a support bracket 44. The other end of shaft 30 is supported by a sleeve bearing assembly 46. It is important to note that a second sleeve bearing assembly 46 could be modified to serve as the output-end support bracket 44. Once supported, shaft 30 is rotatable about an axis of rotation 50.

Figure 2:
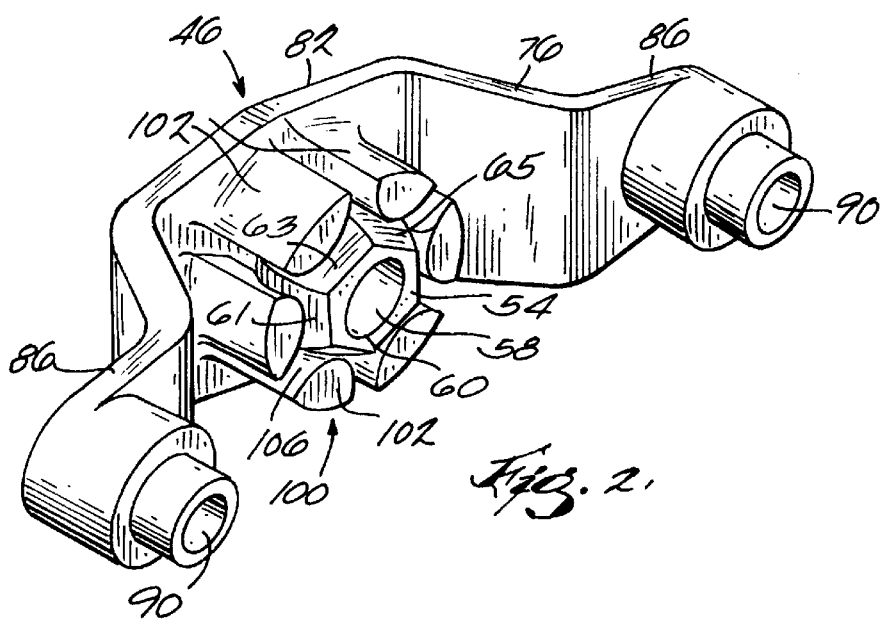
FIG. 2 is a perspective view of the bearing bracket and the bearing.

The sleeve bearing assembly 46 includes (see FIG. 2) a bearing 54 having therein a bore 58 for receiving the shaft 30. The bore is thus centered on the rotational axis 50. In the preferred embodiment, the end of the bore 58 includes a chamfer 60 that facilitates insertion of the shaft 30 into the bore 58 and reduces shaft wear. The bearing 54 is preferably made from high graphite iron and is free from burrs, irregularities, or foreign particles.

The bearing 54 has six cylindrical outer surface portions 61, 62, 63, 64, 65 and 66. The term "cylindrical outer surface portion" does not mean that the surface portion defines a complete cylinder, but rather that the surface portion defines part of a cylinder. The surface portions 61 and 62 are centered on an axis 71 (see FIG. 5) substantially perpendicular to the axis of rotation 50. The surface portions 63 and 64 are centered on an axis 73 substantially perpendicular to the axis of rotation 50, and the surface portions 65 and 66 are centered on an axis 75 substantially perpendicular to the axis of rotation 50. The six cylindrical outer surface portions 61, 62, 63, 64, 65 and 66 therefore define three sets of diametrically opposed cylindrical outer surface portions, with the two surface portions in each set having a common axis. The axes 71, 73 and 75 all lie in the same plane (represented by line 72 in FIG. 6) perpendicular to the axis 50, and the axes 71, 73 and 75 are spaced at equal angular intervals of sixty degrees, as shown in FIG. 5.

The sleeve bearing assembly 46 also includes (see FIGS. 2–5) a bearing support bracket 76 having an axis 78. The bearing support bracket is preferably made from molded nylon 6/6 which is thirty percent glass-filled. The bracket 76 includes a main body 82 and arms 86 that extend from the main body 82 and that have therein mounting holes 90. Bolts or screws 94 pass through similar mounting holes 90 in the support bracket 44, through holes 96 in the stator 18, and thread into the mounting holes 90 in the bracket 76. The bolts or screws 94 fix both the bearing support bracket 76 and the support bracket 44 relative to the stator 18.

The bearing support bracket 76 includes a bearing socket 100 defined by a plurality of circuitously spaced resilient projections 102 that extend from the main body 82 and that extend generally parallel to the bracket axis 78. The socket 100 is centered on the bracket axis 78 and houses the bearing 54. Each projection 102 has an inwardly facing surface 106 (see FIGS. 4 and 6) that engages a respective one of the bearing surface portions 61, 62, 63, 64, 65 and 66. As best shown in FIG. 6, each surface 106 is concave at the intersection of the inwardly facing surface 106 with a plane including the bracket axis 78 (FIG. 6 is a sectional view in such a plane, and three such planes are identified by reference numeral 108 in FIG. 4). Each surface 106 intersects the respective plane 108 and also, at least when the bracket axis 78 is aligned with the shaft axis 50, engages the respective bearing surface portion 61, 62, 63, 64, 65 or 66 along a portion of a circle (one such circle is identified by reference numeral 109 in FIG. 6) that is centered on the axis 71, 73 or 75 of the respective bearing surface portion 61, 62, 63, 64, 65 or 66. As best shown in FIG. 4, each inwardly facing surface 106 is also convex at the intersection of the inwardly facing surface 106 with a plane substantially perpendicular to said bracket axis 78 (FIG. 4 is a sectional view in such a plane). Thus, the surfaces 106 are saddle-shaped, being concave in one direction but convex in the other direction.

During operation of the motor 10, the axis of rotation 50 of the rotor shaft 30 can move slightly relative to the bracket 76, causing misalignment between the bearing 54 and the socket 100. Due to the nature of the engagement between the bearing 54 and the socket 100 (i.e., between the bearing surface portions 61, 62, 63, 64, 65 and 66 and the bracket surfaces 106), the bearing 54 is free to move angularly to correct for misalignment between the axis of rotation 50 and the bracket axis 78. The saddle-shaped nature of the inwardly facing surfaces 106 theoretically provides, at minimum, point contact with the bearing 54 at each projection 102 and, at maximum, contact along a portion of a circle as described above. Obviously the engagement between the bearing 54 and the bracket 76 may sometimes be different in practice, but it has been found that this construction allows for optimal angular movement of the bearing 54, within the socket 100, for self-alignment with the shaft 30. At the same time, the engagement of the bearing by the bracket 76 substantially prevents the bearing 54 from rotating with the shaft 30 about the axis of rotation 50.

Various features of the invention are set forth in the following claims.

What is claimed is:

1. A floating sleeve bearing assembly for supporting the shaft of an electric motor, the shaft having an axis of rotation and the motor having a stator, the sleeve bearing assembly comprising:

a bearing having therein a bore for receiving the shaft, said bearing having a plurality of cylindrical outer surface portions centered on respective axes which are substantially perpendicular to the axis of rotation and which all lie in the same plane substantially perpendicular to the axis of rotation; and a bearing support bracket fixable relative to the stator, said bracket defining a socket housing said bearing, so as to allow angular movement of said bearing within said socket to compensate for axial misalignment between the shaft and said socket, while at the same time substantially preventing rotation of said bearing about the axis of rotation.

2. The floating sleeve bearing assembly as claimed in claim 1, wherein the respective axes of said cylindrical outer surface portions are spaced at equal angular intervals.

3. The floating sleeve bearing assembly as claimed in claim 1, wherein said bearing has six cylindrical outer surface portions with respective axes spaced at 60 degree intervals.

4. The floating sleeve bearing assembly as claimed in claim 1, wherein said bearing has three sets of diametrically opposed cylindrical outer surface portions, each one of said sets having a respective common axis, said respective common axes spaced at 60 degree intervals.

5. The floating sleeve bearing assembly as claimed in claim 1, wherein said bore includes an end having a chamfer for receiving the shaft.

6. The floating sleeve bearing assembly as claimed in claim 1, wherein said bearing is made of high graphite iron.

7. The floating sleeve bearing assembly as claimed in claim 1, wherein said bearing support bracket is made of molded glass-filled nylon.

8. The floating sleeve bearing assembly as claimed in claim 1, wherein said bracket has an axis on which said socket is centered, said bracket further including a main body and a plurality of circuitously spaced resilient projections extending from said main body and generally parallel to said bracket axis, each of said projections having an inwardly facing surface which is concave at the intersection of said surface with a plane including said bracket axis, said projections together defining said socket.

9. The floating sleeve bearing assembly as claimed in claim 8, wherein the number of projections corresponds to the number of cylindrical outer surface portions and each projection engages a respective one of said cylindrical outer surface portions.

10. The floating sleeve bearing assembly as claimed in claim 1, wherein said bracket has an axis on which said socket is centered, said bracket further including a main body and a plurality of circuitously spaced resilient projections extending from said main body and generally parallel to said bracket axis, each of said projections having an inwardly facing surface which is convex at the intersection of said surface with a plane substantially perpendicular to said bracket axis, said projections together defining said socket.

11. The floating sleeve bearing assembly as claimed in claim 10, wherein the number of projections corresponds to the number of cylindrical outer surface portions and each projection engages a respective one of said cylindrical outer surface portions.

12. The floating sleeve bearing assembly as claimed in claim 11, wherein each of said inwardly facing surfaces is concave at the intersection of said surface with a plane including said bracket axis.

13. The floating sleeve bearing assembly as claimed in claim 12, wherein each respective engagement of an inner surface and the corresponding cylindrical outer surface portion defines a portion of a circle centered on the respective axis of said corresponding cylindrical outer surface portion.

14. A floating sleeve bearing assembly for supporting the shaft of an electric motor, the shaft having an axis of rotation and the motor having a stator, the sleeve bearing assembly comprising:

a bearing having therein a bore for receiving the shaft; and a bearing support bracket having an axis and including a main body fixable relative to the stator, and including a plurality of circuitously spaced resilient projections extending from said main body and generally parallel to said bracket axis, each of said projections having an inwardly facing surface which is concave at the intersection of said surface with a plane including said bracket axis, said projections together defining a socket centered on said bracket axis, said socket housing said bearing and said inwardly facing surfaces engaging said bearing so as to allow angular movement of said bearing within said socket to compensate for axial misalignment between the axis of rotation and said bracket axis, while at the same time substantially preventing rotation of said bearing about the axis of rotation.

15. The floating sleeve bearing assembly as claimed in claim 14, wherein each of said intersections defines a portion of a circle centered on respective axes which are substantially perpendicular to the axis of rotation and which all lie in the same plane substantially perpendicular to the axis of rotation.

16. The floating sleeve bearing assembly as claimed in claim 14, wherein each of said inwardly facing surfaces is convex at the intersection of said surface with a plane substantially perpendicular to said bracket axis.

17. The floating sleeve bearing assembly as claimed in claim 16, wherein each inwardly facing surface engages said bearing, said engagement defining a portion of a circle centered on respective axes which are substantially perpendicular to the axis of rotation and which all lie in the same plane substantially perpendicular to the axis of rotation.

18. A floating sleeve bearing assembly for supporting the shaft of an electric motor, the shaft having an axis of rotation and the motor having a stator, the sleeve bearing assembly comprising:

a bearing having therein a bore for receiving the shaft; and a bearing support bracket having an axis and including a main body fixable relative to the stator, and including a plurality of circuitously spaced resilient projections extending from said main body and generally parallel to said bracket axis, each of said projections having an inwardly facing surface which is convex at the intersection of said surface with a plane substantially perpendicular to said bracket axis, said projections together defining a socket centered on said bracket axis, said socket housing said bearing and said inwardly facing surfaces engaging said bearing so as to allow angular movement of said bearing within said socket to compensate for axial misalignment between the axis of rotation and said bracket axis, while at the same time substantially preventing rotation of said bearing about the axis of rotation.

19. The floating sleeve bearing assembly as claimed in claim 18, wherein each inwardly facing surface maintains at least a point contact with said bearing.

20. An electric motor comprising:

a stator;

a rotor;

a shaft which has an axis of rotation and which supports said rotor for rotation relative to said stator;

a bearing having therein a bore receiving the shaft, said bearing having a plurality of cylindrical outer surface portions centered on respective axes which are substantially perpendicular to the axis of rotation and which all lie in the same plane substantially perpendicular to the axis of rotation; and a bearing support bracket having an axis and including a main body fixed relative to said stator, and including a plurality of circuitously spaced resilient projections extending from said main body and generally parallel to said bracket axis, the number of projections corresponding to the number of cylindrical outer surface portions, each of said projections having an inwardly facing surface which is convex at the intersection of said surface with a plane substantially perpendicular to said bracket axis and which is concave at the intersection of said surface with a plane including said bracket axis, said projections together defining a socket centered on said bracket axis, said socket housing said bearing such that each of said inwardly facing surfaces engages a respective one of said cylindrical outer surface portions along a portion of a circle centered on the axis of said respective cylindrical outer surface portion, so as to allow angular movement of said bearing within said socket to compensate for axial misalignment between the axis of rotation and said bracket axis, while at the same time substantially preventing rotation of said bearing about the axis of rotation.

\* \* \* \* \*

UNITED STATES PATENT AND TRADEMARK OFFICE
CERTIFICATE OF CORRECTION

PATENT NO.    : 6,183,136 B1                                    Page 1 of 1
DATED         : February 6, 2001
INVENTOR(S)   : Guy Dingman It is certified that error appears in the above-identified patent and that said Letters Patent is hereby corrected as shown below:

Title page,
"[75] Inventor", delete the inventor's residence of "Monon, IN (US)" and insert
-- Zionsville, IN (US) --.

Signed and Sealed this

Thirtieth Day of October, 2001

Attest:

NICHOLAS P. GODICI
Attesting Officer    Acting Director of the United States Patent and Trademark Office